(12) United States Patent
Leger et al.

(10) Patent No.: US 8,870,666 B1
(45) Date of Patent: Oct. 28, 2014

(54) MUD MOTOR UNIVERSAL JOINT ASSEMBLY

(71) Applicant: Renegade Manufacturing, LLC, Youngsville, LA (US)

(72) Inventors: Jamie Leger, Youngsville, LA (US); Scott Kerstetter, Youngsville, LA (US)

(73) Assignee: Renegade Manufacturing, LLC, Youngsville, LA (US)

( * ) Notice: Subject to any disclaimer, the term of this patent is extended or adjusted under 35 U.S.C. 154(b) by 0 days.

(21) Appl. No.: 13/891,395

(22) Filed: May 10, 2013

(51) Int. Cl.
F16D 3/19 (2006.01)
F16D 3/50 (2006.01)

(52) U.S. Cl.
CPC .................................... F16D 3/50 (2013.01)
USPC ...................................................... 464/149

(58) Field of Classification Search
USPC ................... 464/149, 157; 175/101, 106, 107
See application file for complete search history.

(56) References Cited

U.S. PATENT DOCUMENTS

| | | | |
|---|---|---|---|
| 829,977 | A | 9/1906 | Lockwood |
| 855,106 | A | 5/1907 | Hensel |
| 4,391,547 | A | 7/1983 | Jackson, Jr. et al. |
| 4,772,246 | A | 9/1988 | Wenzel |
| 4,982,801 | A | 1/1991 | Zitka et al. |
| 5,000,723 | A | 3/1991 | Livingstone |
| 5,205,789 | A | 4/1993 | Falgout, Sr. |
| 5,267,905 | A | 12/1993 | Wenzel et al. |
| 5,503,236 | A | 4/1996 | Tibbitts |
| 5,651,737 | A | 7/1997 | Le Blanc |
| 5,704,838 | A | 1/1998 | Teale |
| 6,554,083 | B1 | 4/2003 | Kerstetter |
| 7,004,843 | B1 | 2/2006 | Kerstetter |
| 7,063,175 | B1 | 6/2006 | Kerstetter |
| 7,549,487 | B2 | 6/2009 | LeBlanc et al. |
| 7,624,819 | B1 | 12/2009 | LeBlanc et al. |
| 8,285,411 | B2 | 10/2012 | Hull et al. |

FOREIGN PATENT DOCUMENTS

| | | | | |
|---|---|---|---|---|
| CH | 35597 | * | 1/1906 | .................... 464/149 |
| GB | 739892 | * | 11/1953 | .................... 464/157 |

OTHER PUBLICATIONS

Molded Rubber Specialties, LLC, "Material Specification: 90 durometer HNBR (HSN)", date unknown, 1 page, Molded Rubber Specialties, LLC, Carencro, Louisiana (USA).
Robinson Rubber Products Company, Inc., "Rubber Material Selection Guide", 2005, pp. 1-3, Robinson Rubber Products Company, Inc., Minneapolis, Minnesota (USA).
Henkel Corporation, "LOCTITE(R) 770 (TM) Technical Data Sheet", Dec. 2008, pp. 1-3, Henkel Corporation (USA).
Henkel Corporation, "LOCTITE(R) 4203 (TM) Technical Data Sheet", Mar. 2010, pp. 1-3, Henkel Corporation (USA).
Metro Industries, Inc., "Rubber Properties", Aug. 27, 2005, pp. 1-3, Metro Industries, Inc., Grandview, Missouri 64030 (USA).

* cited by examiner

*Primary Examiner* — Gregory Binda
(74) *Attorney, Agent, or Firm* — Jeffrey L. Wendt; The Wendt Firm, P.C.

(57) ABSTRACT

A mud motor universal joint assembly includes a pair of cylindrical drivers and a cylindrical driven member. Each drive member is configured to attach to a drive unit at one end, and to a driven member at second ends through interlocking tangs. Each cylindrical drive member has an internal blind tapered bore within the interlocking tang portion containing a hard cylindrical load bearing member. The assembly is connected by hardened cylindrical rod members inserted into the internal blind tapered bores of each drive member and retained therein by a plurality of balls in recesses. The drive members, connecting rods, and bearing members may be surface hardened to improve wear. Tang portions may include cavities with rubber inserts therein to reduce slack and slapping during use down hole.

15 Claims, 4 Drawing Sheets

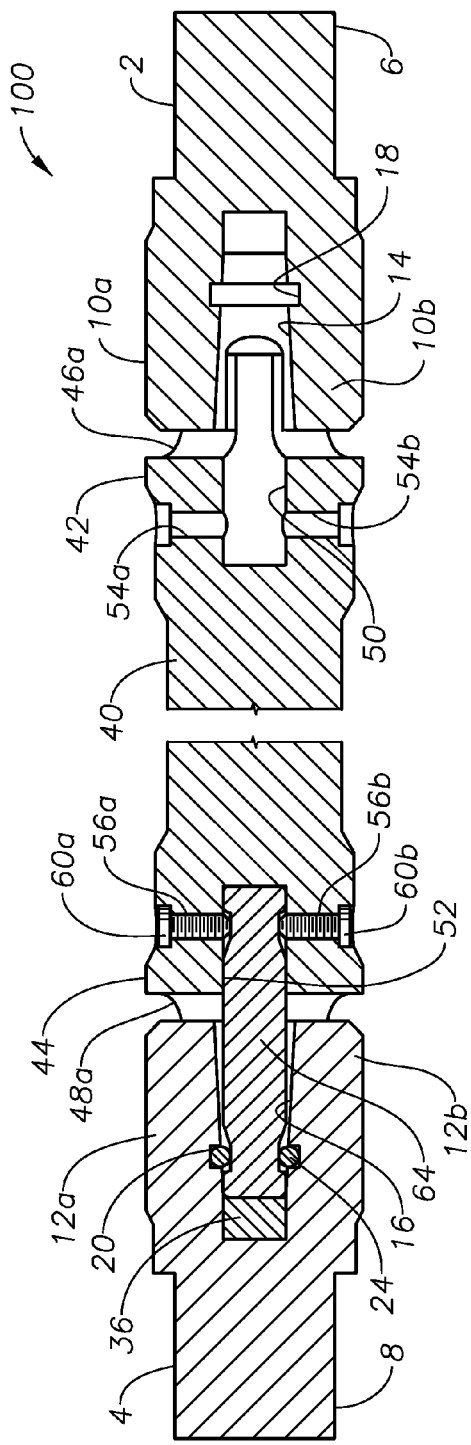
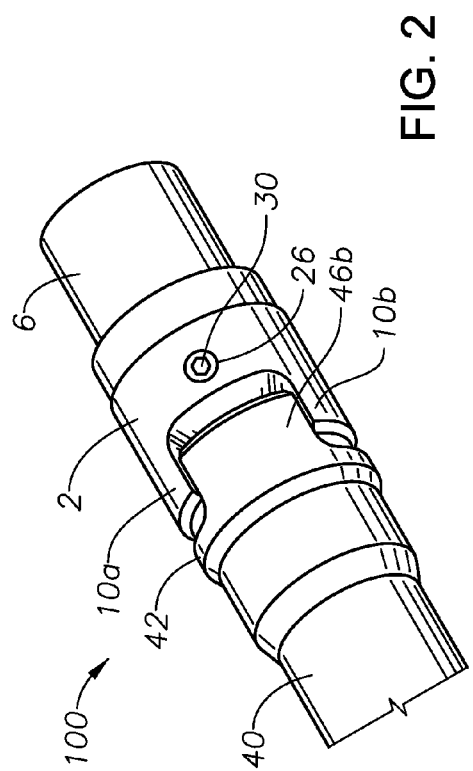
FIG. 1
FIG. 2

MUD MOTOR UNIVERSAL JOINT ASSEMBLY

BACKGROUND INFORMATION

1. Technical Field

The present disclosure relates generally to the field of universal joints and more particularly to universal joints used in down hole mud motors.

2. Background Art

Down hole mud motors are used within the oil industry for earth boring operations. These mud motors rotate eccentrically. The eccentric rotation must be converted into concentric rotation in order for the drill bit to function correctly. The current state of the art generally accomplishes this conversion by providing a drive shaft having some type of universal joint connection that connects the down hole motor to a drive assembly rotating the drill bit.

U.S. Pat. No. 7,004,843 discloses a universal joint assembly including a pair of interfacing joint member assemblies that are loosely retained one to the other by a connecting rod. This arrangement allows torque to be transmitted from one member to the other via interfacing jaw portions while still allowing for angular defection. The joint member assemblies further include retainer pins and setscrews. The interfacing ends of the joint members are machined in a manner whereby the ends of each cylinder are centrally bored creating a tapered blind bore. Each cylinder is then diametrically quartered outwardly from the central axis with opposing quarters removed for a predetermined depth, thus leaving a pair of wedge shaped, opposing mortised tangs. The tangs are slightly smaller in width than the removed quarter portions, thus allowing for a loose fit when interfacing the two joint members. A hardened steel cylindrical bearing member is slidably located in the bottom of the blind hole in each of the cylindrical joint body members. The connecting rod has a reduced diametrical neck portion and a radial or crowned head portion at each end. At assembly a portion of the connecting rod is slidably inserted into the blind bores of each of the body members. The connecting rod has sufficient length so as to maintain spacing between the body members relative to the connecting rod.

In the assemblies disclosed in the '843 patent, the body members are each bored perpendicularly to accept two parallel retaining pins at points intersecting the respective neck portions of the connecting rod. Sufficient clearance between the neck portions of the connecting rod and the parallel retaining pins is provided to allow the connecting rod to slide, rotate within the body members and make pivotal contact with the bearing members. The parallel bores extend clear through the joint members, thereby allowing access to the retaining pins for removal. The bores are then counter bored to receive the retaining pins and counter bored again and tapped to receive setscrews.

Replacement of the joint or its components is a costly operation and thus to be avoided if at all possible. Operators and service companies continuously seek down hole components possessing higher tensile strength and/or higher overpull capacity. While the assemblies disclosed in the '843 patent are admirable, assemblies having even higher tensile strength and/or higher overpull capacity are desired, as are components possessing greater performance and life expectancy.

SUMMARY

In accordance with the present disclosure, mud motor universal joint assemblies are described that may increase life of such assemblies, and provide higher tensile strength and/or higher overpull capacity.

Mud motor universal joint assemblies of this disclosure comprise:

a) first and second cylindrical driver body members each configured to connect to a drive at one end and each having a mortised pair of diametrically quartered tang portions at opposite ends, a central internal blind bore comprising a circumferential recess, at least one perpendicular bore intersecting one wall of the central internal blind bore at the opposite end, caps in respective perpendicular bores, and a cylindrical bearing member slidably inserted within the internal blind bore of each driver body member;

b) a cylindrical driven body member having first and second ends, each end having a mortised pair of diametrically quartered tang portions, a central internal blind bore, and at least one perpendicular bore intersecting one wall of each central internal blind bore behind the tang portions, the tang portions of the first cylindrical driver body being juxtaposed in a meshing manner with the first end tang portions of the cylindrical driven body member, and the tang portions of the second cylindrical driver body being juxtaposed in a meshing manner with the second end tang portions of the cylindrical driven body member, and at least one retainer interposed within the at least one perpendicular bore intersecting one wall of each central internal blind bore behind the tang portions of the cylindrical driven body member;

c) first and second connecting rods each having a neck portion and a crowned head portion at each end, first ends of each connecting rod slidably inserted within the central blind bores of the cylindrical driver body members and in contact with the cylindrical bearing members, such that the neck portions are opposite the circumferential recesses, and second ends of each connecting rod slideably inserted within respective blind bores of the cylindrical driven body member; and d) first and second pluralities of ball bearings positioned in respective neck portions of the ends of the first and second connecting rods inserted within the central blind bore of the first and second cylindrical driver body members, the ball bearings also partially positioned in the circumferential recesses.

Certain embodiments may comprise at least one cavity in at least one tang portion of at least one of the first and second cylindrical driver body members, and/or the cylindrical driven body member, the cavity filled with a rubber insert.

Assemblies of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached schematic drawings in which:

FIG. 1 is a cross-sectional view of one assembly embodiment;

FIG. 2 is a perspective view a portion of the embodiment of FIG. 1;

DETAILED DESCRIPTION

It is to be noted, however, that the appended drawings are schematic only, may not be to scale, illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed apparatus and methods. However, it will be understood by those skilled in the art that the apparatus and methods covered by the claims may be practiced without these details and that numerous variations or modifications from the specifically described embodiments may be possible and are deemed within the claims. All U.S. published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

Figure 3:
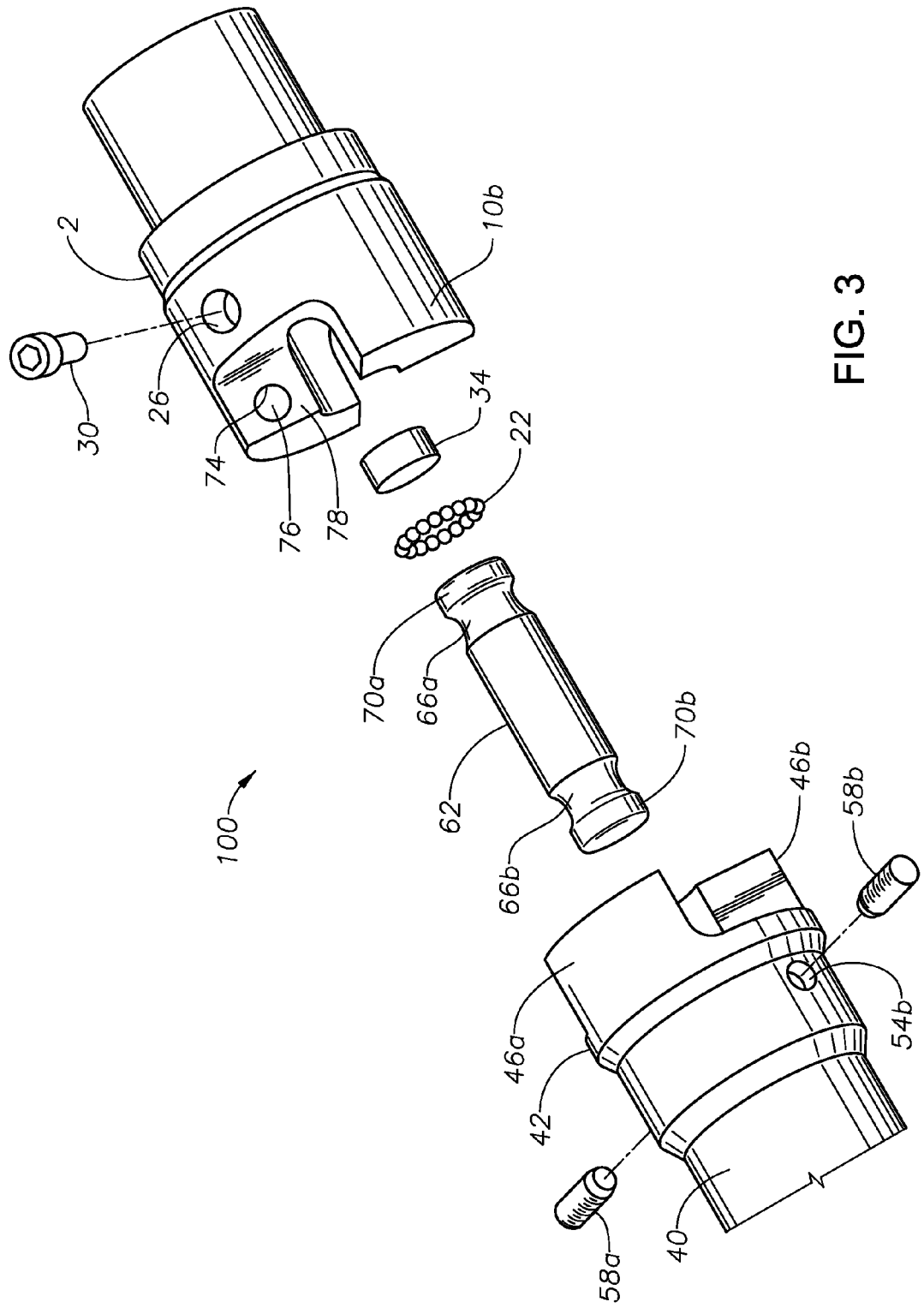
FIG. 3 is an exploded perspective view of the embodiment of FIG. 2.
Figure 4:
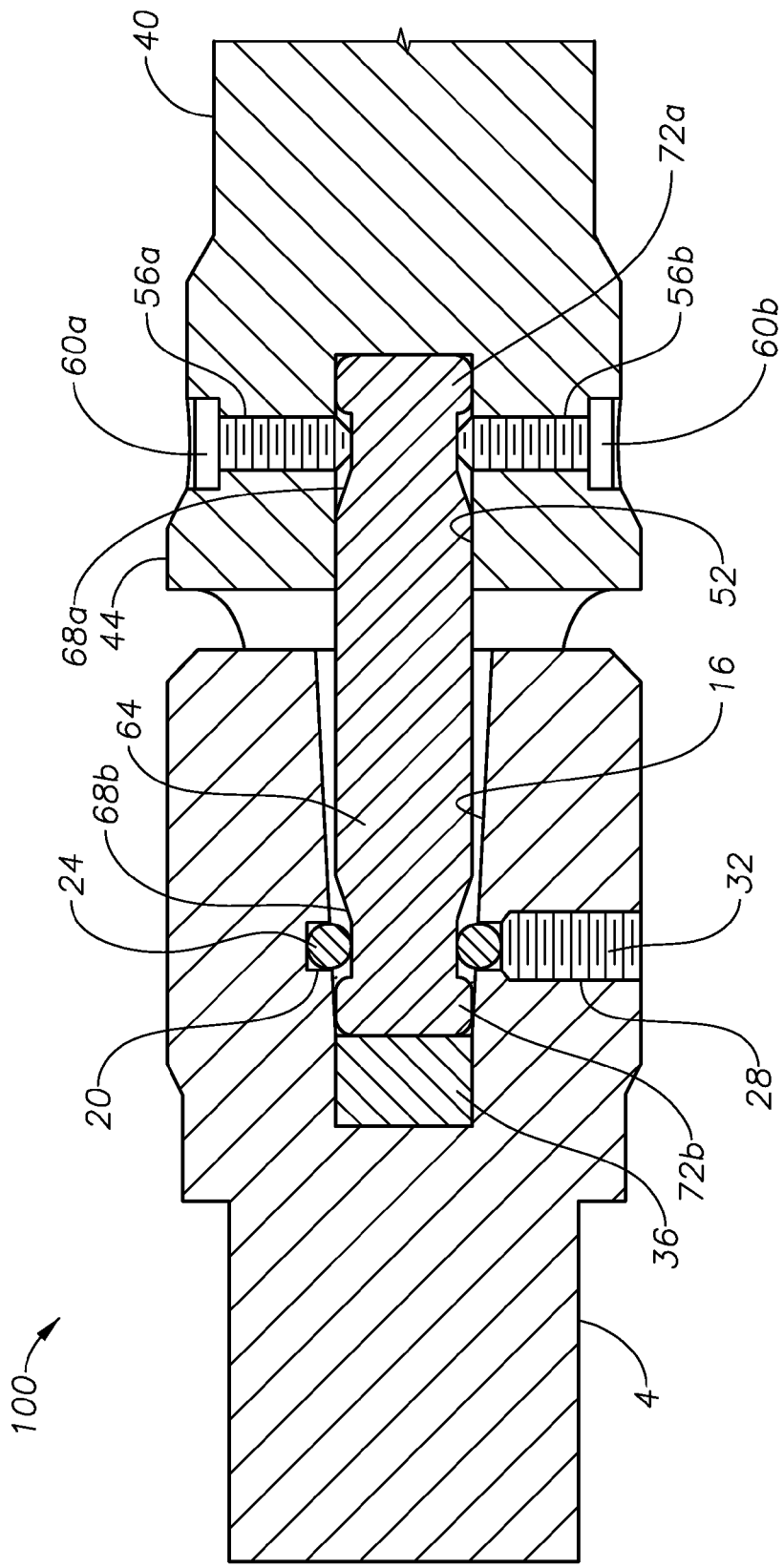
FIG. 4 is a more detailed cross-section view of a portion the assembled embodiment of FIG. 1.

FIGS. 1-4 are various views of one assembly embodiment 100 of the present disclosure, wherein FIG. 1 is a cross-sectional view of assembly embodiment 100, FIG. 2 is a perspective view a portion of the embodiment of FIG. 1, FIG. 3 is an exploded perspective view of the embodiment of FIG. 2, and FIG. 4 is a more detailed cross-section view of a portion the assembled embodiment of FIG. 1. Assembly embodiment 100 includes first and second cylindrical driver body members 2, 4, each having one end 6, 8 configured to attach to a drive unit (not illustrated). The configurations to connect to drive units may include external threads or any other connecting feature. First and second cylindrical driver body members 2, 4, each have a pair of diametrically opposed tang portions 10a, 10b, 12a, and 12b, as illustrated in the various views, as well as tapered central blind bores 14, 16, the taper not necessary, but in embodiments providing range of angulation as discussed in the previously mentioned U.S. Pat. No. 7,004, 843. Each central blind bore 14, 16 includes a circumferential recess 18, 20 accommodating a plurality of ball bearings 22, 24. In certain embodiments there may be more than one circumferential recess, and these recesses may be the same or different in width and depth to accommodate same or different size balls.

Each of cylindrical driver body members 2, 4 further include at least one perpendicular bore 26, 28 through which balls are supplied to the assemblies during make-up of the assemblies, as explained more fully herein. Cap screws 30, 32 seal the perpendicular bores 26, 28, respectively.

Each of cylindrical driver body members 2, 4 further include cylindrical bearing members 34, 36, as clearly illustrated in FIGS. 1, 3 and 4.

Assembly embodiment 100 further includes a cylindrical driven body member 40 having first and second ends 42, 44, each having respective diametrically opposed tang portions 46a, 46b, 48a, and 48b, as well as non-tapered central blind bores 50, 52. Each of first and second ends 42, 44 include, in embodiment 100, a pair of perpendicular bores 54a, 54b, 56a, and 56b positioned behind respective tang portions 46a, 46b, 48a, 48b, and held in by respective set screws 58a, 58b, 60a, 60b. The position of bores 54 and corresponding set screws 58 correspond in turn to the position of neck portions 66a, 66b, 68a, 68b of connecting rods 62, 64. Connecting rods 62, 64 may each have respective crowned head portions 70a, 70b, 72a, 72b on opposites ends thereof, as in the '843 patent.

As with the previously patented assemblies of U.S. Pat. No. 7,004,843, cylindrical driver body members 2, 4, and cylindrical driven body member 40 are loosely retained one to the other by the connecting rods 62, 64. This loose fitting arrangement allows torque to be transmitted from one member to the other via interfacing tang portions while still allowing for angular defection. Unlike universal joints generally used in connection with mud motor drives, the joint assemblies of the present disclosure do not rely on the connecting rods to transmit torque. The connecting rods simply retain the members 2, 4, and 40 in close proximity with each other longitudinally. Obviously, angulations of the assemblies may be increased (or decreased) by adding (or removing) joints connected by intermediate tubular members thereby compounding (or reducing) the deflection angle relative to the central axes of the assembly.

The assemblies of the present disclosure exhibit increased tensile strength and/or overpull capacity compared to those of U.S. Pat. No. 7,004,843. The joint member assemblies of the 843 patent include retainer pins and setscrews. As with the assemblies of the 843 patent, cylindrical driver body members 2, 4, and driven body member 40 are diametrically quartered outwardly from the central axis with opposing quarters removed for a predetermined depth, thus leaving a pair of wedge shaped, opposing mortised tangs that are slightly smaller in width than the removed quarter portions, thus allowing for a loose fit when interfacing, and the upper edges of the tangs are beveled to further reduce interference between the members. As with the assemblies of the 843 patent, the cylindrical rod members 62, 64 may be hardened steel, as may be cylindrical bearing members 34, 36 slidably located in the bottom of the blind holes 14, 16 in each of the cylindrical driver body members 2, 4. Connecting rods 62, 64 are hardened cylindrical rods having reduced diametrical neck portions and radial or crowned head portions at each end. However, in the assemblies of the 843 patent, it may be seen that the cylindrical body members therein are bored perpendicularly to accept parallel retaining pins at a point intersecting the neck portions of the connecting rod. The parallel bores in the 843 patent extend clear through the joint members, thereby allowing access to the retaining pins for removal, and the bores are then counter bored to receive the retaining pins and counter bored again and tapped to receive setscrews. In contrast, assemblies of the present do not have parallel retaining pins, but rather include balls partially in circumferential recesses, as well as at least one setscrew directly abutting a neck portion of the connecting rods. The circumferential recesses and balls arrangement provides increased tensile strength by spreading the force around the circumference of the members, rather than concentrating it at locations where retaining pins intersect neck portions of the connecting rods as in the previous design. The simplicity of design is maintained, and repairs are easily made, if necessary.

Figure 5:
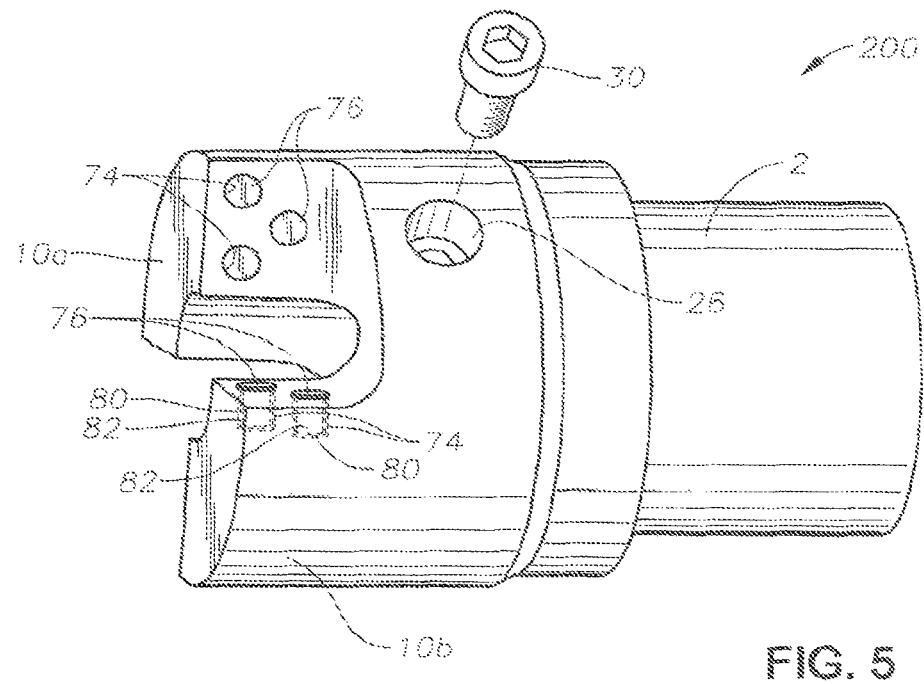
FIG. 5 is a perspective view of a portion of another embodiment.
Figure 6:
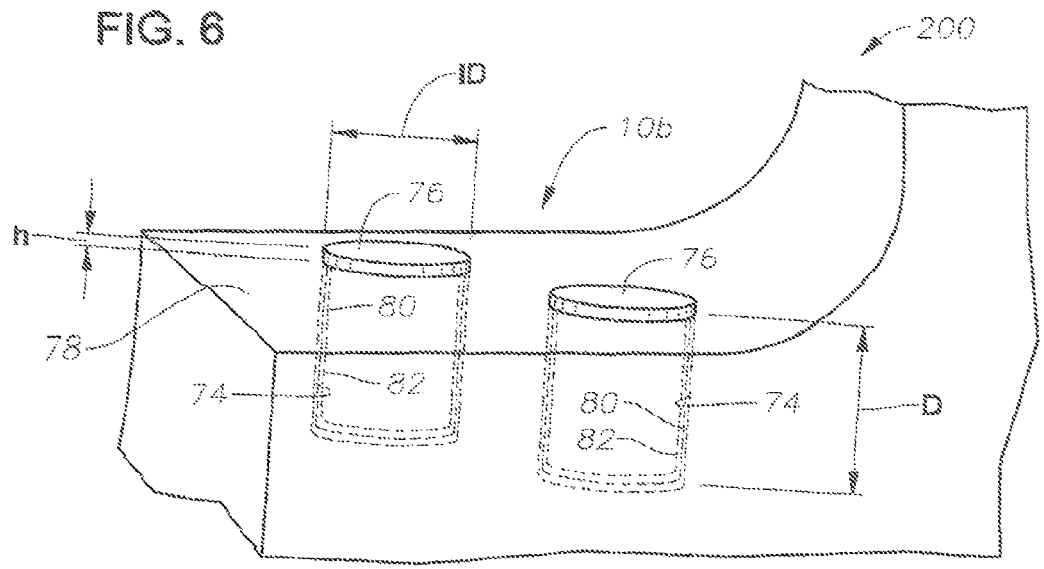
FIG. 6 is a more detailed perspective view of the embodiment of FIG. 5.

As best viewed in FIGS. 3, 5 and 6, a further feature of certain embodiments is the provision of one or more cavities 74 and rubber inserts 76 therein to reduce "backslapping" during use of the assemblies. Backslapping may occur when the assemblies are quickly reversed by a drive unit, such as when running down hole and then quickly reversed out of hole. While the slack discussed above allows angularity of the assemblies down hole, backslapping reduces life expectancy of the units. Reduction of is therefore desired. In embodiments having rubber inserts, backslapping, or the effects there of, may be substantially reduced or eliminated. As may seen in the various figures, cavities 74 and rubber inserts 76 may comprise one or a plurality of cavities and corresponding inserts, and the cavities 74 and inserts 76 make take any suitable arrangement, size, and position on faces of one or more tang portions. Even the provision of one cavity 74 and one corresponding rubber insert 76 on one tang portion may reduce the effects of backslapping. Preferably, each tang portion will have at least one rubber-filled cavity, but this is certainly not necessary.

Embodiment 200 illustrated schematically in FIGS. 5 and 6 illustrate three cavities 74 with respective rubber inserts 76 arranged in a triangular pattern on tang portion 10a, while tang portion 10b features two cavities 74 and corresponding rubber inserts 76 arranged in a linear fashion. FIG. 6 illustrates some of the dimensions of cavities 74 and rubber inserts 76. Cavities 74 may have an inside diameter (ID), a depth (D) and a height (h) above the tang surface 75. In certain embodiments the height (h) may be essentially 0, in other words the rubber insert may be essentially flush with surface 75. In general, cavities 74 in tangs may have any shape, number, and depth in the tangs that do not adversely affect the strength of the tangs. If cylindrical, cavities may have an inner diameter (ID) ranging from about 0.25 inch up to about half the width of a tang, or up to about 5 inches or more (0.64 cm to 13 cm), or from about 1 inch up to about 3 inches (2.54 cm to 7.62 cm); depth (D) ranging from about 0.25 inch up to about half the total depth of the tang, or up to about 2 inches (5.1 cm); and height (h) ranging from 0 up to about 5 cm, or from 0 to about 3 cm, or from 0.25 cm to about 1 cm.

Bearing members, connecting rods, driver body members, driven body members, balls, cap screws, setscrews, and associated components used in assemblies of the present disclosure may be comprised of metal, ceramic, ceramic-lined metal, or combination thereof. Suitable metals include carbon steels, stainless steels, for example, but not limited to, 306 and 316 steel, hardened versions of these, as well as titanium alloys, aluminum alloys, and the like. High-strength materials like C-110 and C-125 metallurgies that are NACE qualified may be employed for bearing members, connecting rods, driver body members, driven body members, balls, cap screws, setscrews, and associated components. (As used herein, "NACE" refers to the corrosion prevention organization formerly known as the National Association of Corrosion Engineers, now operating under the name NACE International, Houston, Tex.) Use of high strength steel and other high strength materials may significantly reduce weight of these components.

The bearing members, connecting rods, driver body members, driven body members, balls, cap screws, setscrews, and associated components, or portions thereof, may comprise the same or different corrosion resistant and/or fatigue resistant material, at least one of the corrosion and/or fatigue resistance being able to withstand the expected down hole service conditions experienced during a drilling or other operation.

In certain embodiments, the bearing members, connecting rods, driver body members, driven body members, balls, cap screws, setscrews, and associated components, or portions thereof such as surface coatings, may comprise same or different noble metals or other exotic corrosion and/or fatigue-resistant materials, such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal. In certain embodiments the bearing members, connecting rods, driver body members, driven body members, balls, cap screws, setscrews, and associated components seat, post, driver, balls, cap screws, setscrews, driven, and/or drivers may comprise a platinum/rhodium alloy skin or coating attached to base metal using a variety of techniques.

When in alloyed form, alloys of two or more noble metals may have any range of noble metals. For example, alloys of two noble metals may have a range of about 0.01 to about 99.99 percent of a first noble metal and 99.99 to 0.01 percent of a second noble metal. Any and all ranges in between 0 and 99.99 percent first noble metal and 99.99 and 0 percent second noble metal are considered within the present disclosure, including 0 to about 99 percent of first noble metal; 0 to about 98 percent; 0 to about 97 percent; 0 to about 96; 0 to about 95; 0 to about 90; 0 to about 80; 0 to about 75; 0 to about 70; 0 to about 65; 0 to about 60; 0 to about 55; 0 to about 50; 0 to about 45, 0 to about 40; 0 to about 35; 0 to about 30; 0 to about 25; 0 to about 20; 0 to about 19; 0 to about 18; 0 to about 17; 0 to about 16; 0 to about 15; 0 to about 14; 0 to about 13; 0 to about 12; 0 to about 11; 0 to about 10; 0 to about 9; 0 to about 8; 0 to about 7; 0 to about 6; 0 to about 5; 0 to about 4; 0 to about 3; 0 to about 2; 0 to about 1; and 0 to about 0.5 percent of a first noble metal; with the balance comprising a second noble metal, or consisting essentially of a second noble metal (for example with one or more base metals present at no more than about 10 percent, or no more than about 9 percent base metal, or no more than about 8, or about 7, or about 6, or about 5, or about 4, or about 3, or about 2, or no more than about 1 percent base metal).

In certain noble metal alloy embodiments comprising three or more noble metals, the percentages of each individual noble metal may range from equal amounts of all noble metals in the composition (about 33.33 percent of each), to compositions comprising, or consisting essentially of, 0.01 percent of a first noble metal, 0.01 percent of a second noble metal, and 99.98 percent of a third noble metal. Any and all ranges in between about 33.33 percent of each, and 0.01 percent of a first noble metal, 0.01 percent of a second noble metal, and 99.98 percent of a third noble metal, are considered within the present disclosure.

The choice of a particular material is dictated among other parameters by the chemistry, pressure, and temperature of mud used and type of formation fluid(s) and other fluids, such as treatment fluids, to be encountered. The skilled artisan, having knowledge of the particular application, pressures, temperatures, and available materials, will be able design the most cost effective, safe, and operable seat, post, driver, balls, cap screws, driven, and drivers for each particular application without undue experimentation.

The terms "corrosion resistant" and "fatigue resistant" as used herein refer to two different failure mechanisms that may occur simultaneously, and it is theorized that these failure mechanisms may actually influence each other in profound ways. It is preferred that the bearing members, connecting rods, driver body members, driven body members, balls, cap screws, setscrews, and associated components have a satisfactory service life of at least six months under conditions existing in a continuous operation, and it is especially preferred that they have a service life greater than twelve months.

In still other embodiments, rubber inserts may be interference or "press" fit to their respective cavities without use of adhesive or primers. In these embodiments, the cavities are machined to sufficiently close tolerances to enable deformation of the rubber insert as the insert is forced into the cavity.

Bearing members, connecting rods, driver body members, driven body members, balls, cap screws, setscrews, and associated components described herein may be made using a variety of processes, including molding, machining, net-shape cast (or near-net shape cast) using rapid prototype (RP)

molds and like processes. Net-shape or near-net shape casting methods of making a variety of molds for producing a variety of complex products are summarized in patents assigned to 3D Systems, Inc., Rock Hill, S.C., U.S.A., for example U.S. Pat. No. 8,285,411.

Properties of the rubber insert(s) in the various embodiments of the present disclosure depend on the assembly geometry used and conditions down hole expected, but generally should have the ability to withstand high temperatures (up to at least about 150° C. (300° F.) or higher) and can withstand harsh chemicals, like oil-based drilling muds, water-based drilling muds, and hydrocarbons, including crude oil and sour fluids. In certain embodiments the material also is able to withstand high flow rates of these fluids. All of the rubber inserts need not be the same material or shape. HNBR (hydrogenated nitrile butadiene rubbers) (ASTM D-2000 classification DH) have recently been developed to meet higher temperatures than standard NBR while retaining resistance to petroleum based oils. Obtained by hydrogenating the nitrile copolymer, HNBR fills the gap left between NBR, EPDM (ethylene-propylene-diene monomer) and FKM (fluorocarbon rubber) elastomers where high temperature conditions require high tensile strength while maintaining excellent resistance to motor oils, sour gas, amine/oil mixtures, oxidized fuels, and lubricating oils. HNBR is resistant to mineral oil-based hydraulic fluids, animal and vegetable fats, diesel fuel, ozone, sour gas, dilute acids and bases. HNBR also resists new bio-oils (biological oils). HNBR is suitable for high dynamic loads and has a good abrasion resistance. HNBR is published to be suitable for temperatures from −30° C. to +150° C. (−20° F. to +302° F.). Properties of HNBR rubbers are summarized in Table 1 (from Robinson Rubber Products Co., Minneapolis, Minn.).

TABLE 1

HNBR rubber properties

| Physical & Mechanical Properties | |
|---|---|
| Durometer or Hardness Range | 30-95 Shore A |
| Tensile Strength Range | 1,500-3,500 PSI |
| Elongation (Range %) | 90%-550% |
| Abrasion Resistance | Good to Excellent |
| Adhesion to Metal | Excellent |
| Adhesion to Rigid Materials | Good to Excellent |
| Compression Set | Good to Excellent |
| Flex Cracking Resistance | Fair to Good |
| Impact Resistance | Excellent |
| Resilience/Rebound | Good |
| Tear Resistance | Good to Excellent |
| Vibration Dampening | Fair to Good |
| Chemical Resistance | |
| Acids, Dilute | Good |
| Acids, Concentrated | Fair to Good |
| Acids, Organic (Dilute) | Good |
| Acids, Organic (Concentrated) | Fair to Good |
| LP gases and Fuel Oils | Excellent |
| Oil resistance | Good to Excellent |
| Petroleum Aromatic | Good to Excellent |
| Petroleum Non-Aromatic | Good to Excellent |

One HNBR rubber found useful is available from Molded Rubber Specialties, LLC, Carencro, La. under the trade designation 90 durometer HNBR (HSN). This particular HNBR has the following specifications: Shore A Hardness=85-92; specific gravity=1.3-1.35; tensile (ultimate)=2800-3100 psi; Modulus (100%)=1500-1800; Elongation %=125-200; Comp Set, %, 22 hours @ 392° F.=30; Color, black.

Other HNBR rubbers may be suitable, such as 50 percent $Li_2CO_3$/50 percent HNBR (GE 2058), available from RheinChemie under the trade designation RHENOGRAN®, may be useful in certain service conditions.

Other materials, such as XNBR (carboxylated nitrile butadiene rubbers) may be used in certain applications. In XNBR rubbers, the carboxyl group is added to significantly improve the abrasion resistance of NBR while retaining excellent oil and solvent resistance. XNBR compounds provide high tensile strength and good physical properties at high temperatures. XNBR is published to be suitable for temperatures from −30° C. to +150° C. (−20° F. to +302° F.).

Certain materials have not fared well in down hole service for this application, such as polyurethanes, as they do not seem to hold their form as well as HNBR after exposure to higher down hole temperatures, and thus are not preferred. However, in an emergency, these materials could be used for limited times until replaced by HNBR or XNBR, for example.

Referring again to FIGS. 5 and 6, in certain embodiments it has been found useful to employ an adhesive 82, in certain embodiments with a primer 80, to adhere rubber inserts 76 into cavities 74. For example, when using one of the preferred HNBR rubber inserts mentioned above available under the trade designation 90 durometer HNBR (HSN), it has been found useful to first prime the rubber insert and/or cavities with an aliphatic primer such as that known under the trade designation LOCTITE® 770 (available from Henkel) followed by an aliphatic cyanoacrylate, elastomer toughened, one-part, atmospheric temperature- and moisture-cured adhesive such as that known under the trade designation LOCTITE® 4203 (available from Henkel). This combination of primer, adhesive, rubber insert, and cylindrical cavity in a stainless steel tang worked well in high flow rate down hole environments; the same rubber inserts in the same cavities with different adhesive systems were unsatisfactory as they did not remain in the cavities for long time as expected in those down hole flow rates. Other primer/adhesive combinations, or adhesives without primer, may be satisfactory depending on the service conditions. For example, certain aliphatic cyanoacrylate adhesives need not be elastomer-toughened, or one-part, or atmospheric temperature-curable, or moisture-curable.

Assembly of embodiments of this disclosure proceeds by placing cylindrical bearing members slidably within the internal blind bore of each driver body member. Then the connecting rods are inserted against the bearing members. Balls are then dropped into perpendicular holes and sit in recesses in the neck portions of the connecting rods and corresponding circumferential recesses in the internal blind bores of the drivers. Cap screws hold the balls in. The cylindrical driven body member is then inserted over the connecting rods, and at least one setscrew (four are depicted in embodiments 100 and 200) is screwed down onto neck portions of the connecting rods as illustrated herein. Rubber inserts may be integral to drivers, or placed therein in the field using suitable drills to create cavities, followed by priming and application of adhesive as desired, depending on the desired performance and service conditions.

The assemblies of the present disclosure are improvements of those now known, featuring higher tensile strength and/or overpull capacity. In certain embodiments, rubber inserts may create a "no slack" coupling assembly. The assemblies are still flexible due to the rubber but the rubber does not allow the coupling to back up and hit (slapping) during drilling. This improves overall performance and life expectancy of the coupling.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. §112, Section F, unless "means for" is explicitly recited together with an associated function. "Means for" clauses are intended to cover the structures, materials, and acts described herein as performing the recited function and not only structural equivalents, but also equivalent structures.

What is claimed is:

1. A mud motor universal joint assembly comprising:
   a) first and second cylindrical driver body members each configured to connect to a drive at one end and each having a mortised pair of diametrically quartered tang portions at opposite ends, a central internal blind bore comprising a circumferential recess, at least one perpendicular bore intersecting one wall of the central internal blind bore at the opposite end, caps in respective perpendicular bores, and a cylindrical bearing member slidably inserted within the internal blind bore of each driver body member;
   b) a cylindrical driven body member having first and second ends, each end having a mortised pair of diametrically quartered tang portions, a central internal blind bore, and at least one perpendicular bore intersecting one wall of each central internal blind bore behind the tang portions, the tang portions of the first cylindrical driver body being juxtaposed in a meshing manner with the first end tang portions of the cylindrical driven body member, and the tang portions of the second cylindrical driver body being juxtaposed in a meshing manner with the second end tang portions of the cylindrical driven body member, and at least one retainer interposed within the at least one perpendicular bore intersecting one wall of each central internal blind bore behind the tang portions of the cylindrical driven body member;
   c) first and second connecting rods each having a neck portion and a crowned head portion at each end, first ends of each connecting rod slidably inserted within the central blind bores of the cylindrical driver body members and in contact with the cylindrical bearing members, such that the neck portions are opposite the circumferential recesses, and second ends of each connecting rod slidably inserted within respective blind bores of the cylindrical driven body member; and
   d) first and second pluralities of ball bearings positioned in respective neck portions of the ends of the first and second connecting rods inserted within the central blind bore of the first and second cylindrical driver body members, the ball bearings also partially positioned in the circumferential recesses.

2. The mud motor universal joint assembly according to claim 1 further comprising at least one cavity in at least one tang portion of at least one of the first and second cylindrical driver body members, and/or the cylindrical driven body member, the cavity filled with a rubber insert.

3. The mud motor universal joint assembly according to claim 2 wherein at least one of the rubber inserts comprises a modified NBR rubber.

4. The mud motor universal joint assembly according to claim 3 wherein the modified NBR rubber is selected from the group consisting of HNBR, ZNBR, and combinations thereof.

5. The mud motor universal joint assembly according to claim 4 wherein at least one of the rubber inserts comprises HNBR, and is adhered into its respective cavity using an adhesive system.

6. The mud motor universal joint assembly according to claim 5 wherein the adhesive system comprises an adhesive composition and a primer for the adhesive composition.

7. The mud motor universal joint assembly according to claim 6 wherein the adhesive is selected from the group consisting of aliphatic cyanoacrylate adhesives, and the primer is selected from the group consisting or aliphatic amine primers.

8. The mud motor universal joint assembly according to claim 2 wherein at least one of the cavities is cylindrical having an inner diameter (ID) ranging from about 0.25 inch up to about 5 inches (0.64 cm to 13 cm), and a depth ranging from about 0.25 inch up to about 2 inches (5.1 cm).

9. The mud motor universal joint assembly according to claim 2 wherein the rubber inert extends above the tang surface a height ranging from about 2 mm to about 1 cm.

10. The mud motor universal joint assembly according to claim 2 wherein each tang of the assembly includes at least one cavity filled with a rubber insert, wherein the cavities may be the same or different in size, shape, and position from cavity to cavity, and the rubber inserts may have the same or different composition from cavity to cavity.

11. The mud motor universal joint assembly according to claim 1 wherein each of the central blind bore located within the first and second cylindrical driver body members are tapered, while the central blind bores in the cylindrical driven body members are not tapered.

12. The mud motor universal joint assembly according to claim 1 wherein first portions of the connecting rods retained within each of the blind central bores of the first and second cylindrical driver body members by the respective plurality of ball bearings, and second portions of the connecting rods are retained within respective blind bores of the cylindrical driven body member by at least one set screw in the at least one perpendicular bore intersecting one wall of each central internal blind bore behind the tang portions of the cylindrical driven bony member.

13. The mud motor universal joint assembly according to claim 1 wherein the first connecting rod maintains the first cylindrical driver body member in opposition to and in a spaced apart relationship with a first end of the cylindrical driven body member, and wherein the second connecting rod maintains the second cylindrical driver body member in opposition to and in a spaced apart relationship with a second end of the cylindrical driven body member.

14. The mud motor universal joint assembly according to claim 1 wherein the crowned head portions of the connecting rods make rotational and pivotal contact with the corresponding cylindrical bearing members.

15. The mud motor universal joint assembly according to claim 1 wherein torque is transmitted from the first cylindrical driver body member through the cylindrical driven body member to the second cylindrical driver body member via the tang portions.

* * * * *